United States Patent [19]

Lyng

[11] Patent Number: 4,688,273
[45] Date of Patent: Aug. 25, 1987

[54] SANITARY SYSTEM FOR SUPPLY OF HOT AND COLD WATER, AND THERMOSTATICALLY CONTROLLED VALVE FOR SUCH SYSTEM

[75] Inventor: Björn Lyng, Vanvikan, Norway

[73] Assignee: Lyng Industrier A/S, Vanvikan, Norway

[21] Appl. No.: 794,922

[22] PCT Filed: Feb. 21, 1985

[86] PCT No.: PCT/NO85/00008
§ 371 Date: Oct. 22, 1985
§ 102(e) Date: Oct. 22, 1985

[87] PCT Pub. No.: WO85/03764
PCT Pub. Date: Aug. 29, 1985

[30] Foreign Application Priority Data

Feb. 22, 1984 [NO] Norway .................................. 840670

[51] Int. Cl.⁴ ............................................... E03C 1/04
[52] U.S. Cl. ............................................ 4/192; 4/191;
4/661; 4/663; 138/33; 174/24; 174/27; 174/47;
236/12.1; 236/91 R; 137/337
[58] Field of Search ............... 137/337, 467, 594, 595,
137/625, 625.18, 625.42; 138/32, 33, 178;
174/8, 10, 19, 21, 24, 27, 47; 236/12.1, 91;
4/192, 191, 663, 661

[56] References Cited

U.S. PATENT DOCUMENTS

| 646,887 | 3/1900 | Stowe . | |
|---|---|---|---|
| 1,698,342 | 1/1929 | McGill | 4/192 |
| 2,823,695 | 1/1958 | Coffin | 137/337 |
| 2,908,017 | 10/1959 | Whaley | 4/663 |
| 3,533,445 | 11/1970 | Kraft | 137/625.18 |
| 3,638,680 | 1/1972 | Kopp | 4/192 |
| 4,322,031 | 3/1982 | Gehlert | 236/12 R |
| 4,330,081 | 5/1982 | McMillan | 236/12.1 |
| 4,381,073 | 4/1983 | Gloor | 236/12.1 |
| 4,554,688 | 11/1985 | Puccerella | 4/192 X |
| 4,563,780 | 1/1986 | Pollack | 4/192 |

FOREIGN PATENT DOCUMENTS

| 147915 | 2/1904 | Fed. Rep. of Germany . | |
|---|---|---|---|
| 1104450 | 4/1961 | Fed. Rep. of Germany . | |
| 2629032 | 6/1975 | Fed. Rep. of Germany . | |
| 2824875 | 12/1979 | Fed. Rep. of Germany | 236/12.1 |
| 2841730 | 4/1980 | Fed. Rep. of Germany | 236/12.1 |
| 3338604 | 11/1983 | Fed. Rep. of Germany . | |
| 2340424 | 5/1976 | France . | |
| 2460003 | 2/1981 | France | 236/12.1 |
| 2494806 | 6/1982 | France . | |

Primary Examiner—Henry K. Artis
Attorney, Agent, or Firm—Wenderoth, Lind & Ponack

[57] ABSTRACT

A sanitary system for thermostatically controlled supply of hot and cold water to a number of tapping locations includes a hot water storage container, piping to the tapping locations, thermostatically controlled mixing valves and tapping faucets or valves. The thermostatically controlled mixing valves are located at the water heater or storage container, and a tapping valve for adjustment and control of the water quantity is mounted at each separate tapping location. One single pipe line extends from each mixing valve to the respective tapping location. The system includes a microprocessor control with a manual temperature control at each tapping location for selection of water temperature, and a thermostatically influenced control system for each of the mixing valves including a processor controlled mechanical drive for adjustment of each mixing valve in correspondence with the water temperature defined at the tapping location.

9 Claims, 8 Drawing Figures

SANITARY SYSTEM FOR SUPPLY OF HOT AND COLD WATER, AND THERMOSTATICALLY CONTROLLED VALVE FOR SUCH SYSTEM

BACKGROUND OF THE INVENTION

The present invention relates to a new sanitary system, especially a system or aggregate for delivery of hot and cold water to a plurality of outlet locations. The invention relates further to a thermostatically controlled mixing valve unit, and a piping structure, particularly useful in the system.

Conventional sanitary systems for delivery of hot and cold water to a plurality of outlet locations, for instance in a private house, comprises a source for cold water, a hot water storage heater with a cold water supply, a piping system to the outlet locations consisting of a cold water pipe and a hot water pipe, and a mixer valve at the tapping position. The piping in the system consists frequently of a set of main pipes, and paired branch pipes to the separate tapping locations. The tapping valves or mixing valves may be of the two-handle type or the one-handle type such that the user by means of two manual movements adjusts the water temperature and the water quantity, respectively.

In recent years it has been quite usual to use so called thermostatic mixing faucets, particularly in bathrooms such that one may pre-adjust the water temperature on a scale displaying the water temperature, and such that one may with one single handle adjust the water quantity.

Conventional sanitary systems for delivery of hot and cold water have reached a high quality, but known systems are still hampered with some inherent drawbacks which have proved difficult to overcome. Firstly, such sanitary systems are rather expensive both to purchase and install, and they require further substantial maintenance, such as replacement of valve packings, etc.

In practical use the drawback frequently occurs that when tapping hot water one must readjust the water temperature several times during the tapping operation, among other reasons because of heating up of the piping system. A further drawback is the creation of pressure drops, sometimes also with abrupt temperature variations, if hot water is being discharged at two or several outlets simultaneously. A further drawback is that delivery of water with high temperature to the various outlets causes large wear on the valves and the packings.

A more serious drawback with known systems is, however, the large heat loss which takes place due to the heating of the pipe system and the fact that by each tapping a relatively large column of hot water will remain standing unused in the piping system.

A further substantial drawback with conventional sanitary systems of this kind is that they cause the creation of substantial piping noise and so called "water shocks". Piping noise is created in the piping as such, particularly in connection with transitions and fittings, as well as in the mixing valves due to the inherent turbulence therein. Such piping noise has proved to be very difficult to diminish, and frequently causes irritation.

By utilization of thermostatically controlled mixing valves it is simpler to tap tempered water with a suitable temperature, but such arrangements are rather expensive and require substantial maintenance if the adjusting ability is to be maintained over a long period of time.

SUMMARY OF THE INVENTION

The main object of the present invention is to provide a new system for delivery of hot and cold water to a plurality of outlet locations. A special object of the invention is to provide a system which results in lower installation costs, is comfortable to use and involves a substantial saving in energy in connection with the consumption of hot water. A further object of the invention is to provide a system which makes it possible to provide quick thermostatically controlled adjustment of the water temperature at the separate discharge outlets.

The present invention is generally based upon the feature that the water quantity and the water temperature, respectively, are adjusted by means of separate valve units, more particularly such that thermostatic adjustment of the water temperature is carried out in a mixing valve positioned at the hot water storage heater, while the water quantity is adjusted manually at the outlet location. In the system in accordance with the invention only one single pipe will normally extend from the hot water storage heater to the tapping location. A sanitary system in accordance with the invention will thus distinguish itself in that one single continuous pipe extends from the hot water storage heater to each of the tapping locations, contrary to conventional systems where two pipes extend to each tapping location, usually in the form of branch pipes from main pipes.

A further important feature of the present invention is that computerized control is utilized for control of the water temperature. At the tapping location is positioned a display with knobs for adjusting a desired water temperature, and a computerized adjustment of the thermostatically control valve is located at the hot water storage heater and is operable to achieve a correct mixture of hot and cold water in accordance with the temperature pre-set at the tapping location. At the tapping location one has normally only a usual single grip valve for adjustment of the water quantity.

In accordance with a further feature of the invention the thermostatic valves for carrying out adjustment of the water temperature are provided in the form of a number of side by side positioned valve units in one separate valve housing or "central block" having therethrough supply passages for delivery of hot and cold water to the separate valve units and discharge ports for the supply of thermostatically adjusted mixed water to the separate tapping locations. The central block with the thermostatic valves is suitably mounted very close to or adjacent the hot water storage heater. Such an arrangement will have several advantages. Thus, the cost of the valves will be much more reasonable than by using separate valve units, and one will obtain use or functional advantages, among which will be that the central block including the valves will be maintained at an even temperature. Tapping of water at the separate discharge locations will in accordance with the invention be rather convenient, inasmuch as the water temperature is pre-adjusted, or it maybe altered to a different desired temperature, such that the tapping faucet adjusts only the water quantity as desired. If it is desired to alter the water temperature, for instance a shift to colder water, during a tapping operation, one simply presses the knob for colder water until the display shows the desired tapping temperature. The temperature display is suitably arranged with a temperature display in the center, a finger knob to the left for reduction of the temperature, and a finger knob to the right for increase of the water temperature, for instance having a scale of 2° C. for each pressing operation, or such that the temperature is continuously altered as long as the finger presses the knob. The alteration of the water temperature as such will, in accordance with the invention, take place rather quickly, because it is possible to utilize piping having small dimensions, for instance 15 mm in diameter, a fact which implies that the water column in the piping from the hot water storage heater will be rather small and quickly will be replaced with water having a temperature as specified on the display. A thermostatic valve in accordance with the invention will also be quick acting, a fact which will appear from the following description.

A system in accordance with the invention for delivery of hot and cold water will possess a number of advantages in addition to those mentioned above. Thus, not only will the existing shortcomings and disadvantages with conventional systems be reduced or eliminated, but the system will further posses other special advantages. The piping one can utilize much smaller pipe dimensions and because almost all fittings, tees, etc. can be eliminated. In spite of the fact that a separate pipe will extend all the way from the water heater to the tapping location, one will altogether use a smaller accumulated piping length than in connection with a corresponding conventional system for hot and cold water where two pipes must extend all the way to each separate tapping location. Smaller and shorter pipe lengths imply reduced energy loss in the piping system, and inasmuch as the hot water is being mixed adjacent the storage heater, less hot water and thus less energy will be consumed. Since only one separate, continuous pipe extends from the hot water heater to the tapping location, one will obtain reduced flow friction and thereby also reduced pipe noise, and simultaneously installation expenses will be reduced. In a sanitary system in accordance with the invention there preferably is used small-sized copper tubing, for instance of 15 mm diameter, of the type having applied therearound (moulded on) an insulating plastic hose. Such tubing can be bent 90° with a bending curvature of about 35 mm without risking fracture of the tubing, a fact which makes it possible to omit pipe fittings in the shape of elbows, etc., which again results in reduced installation costs, reduced flow friction and less piping noise. Piping noise will also be reduced because only one single valve or faucet for adjusting the water quantity is located at least tapping location, inasmuch as the water mixture takes place in the thermostatic valve positioned at the hot water storage heater. Conventional mixing valves or batteries produce, as known, considerable noise caused by the mixing and turbulence in the valve housing. Certainly some noise will be created in the thermostatic valves located at the hot water storage heater, but these valves will firstly not be particularly noise producing, and secondly, these thermostatically controlled mixing valves will be mounted at or on the hot water storage heater, which usually is positioned in the cellar or like area where some noise matters less.

With regard to the computer control, one may in principle utilize systems of per se known type, for instance of the type shown and described in Norwegian patent application No. 83.3107. This patent application relates to a thermostatically controlled mixing valve for hot and cold water. The valve construction in accordance with the invention distinguishes, however, considerably from the valve covered by the beforementioned patent application.

BRIEF DESCRIPTION OF THE DRAWINGS

The invention shall in the following be described with reference to the accompanying drawings which illustrate some embodiments of the system and mixing valve in accordance with the invention, and a special pipe construction, and wherein.

DETAILED DESCRIPTION OF THE INVENTION

Figure 1:
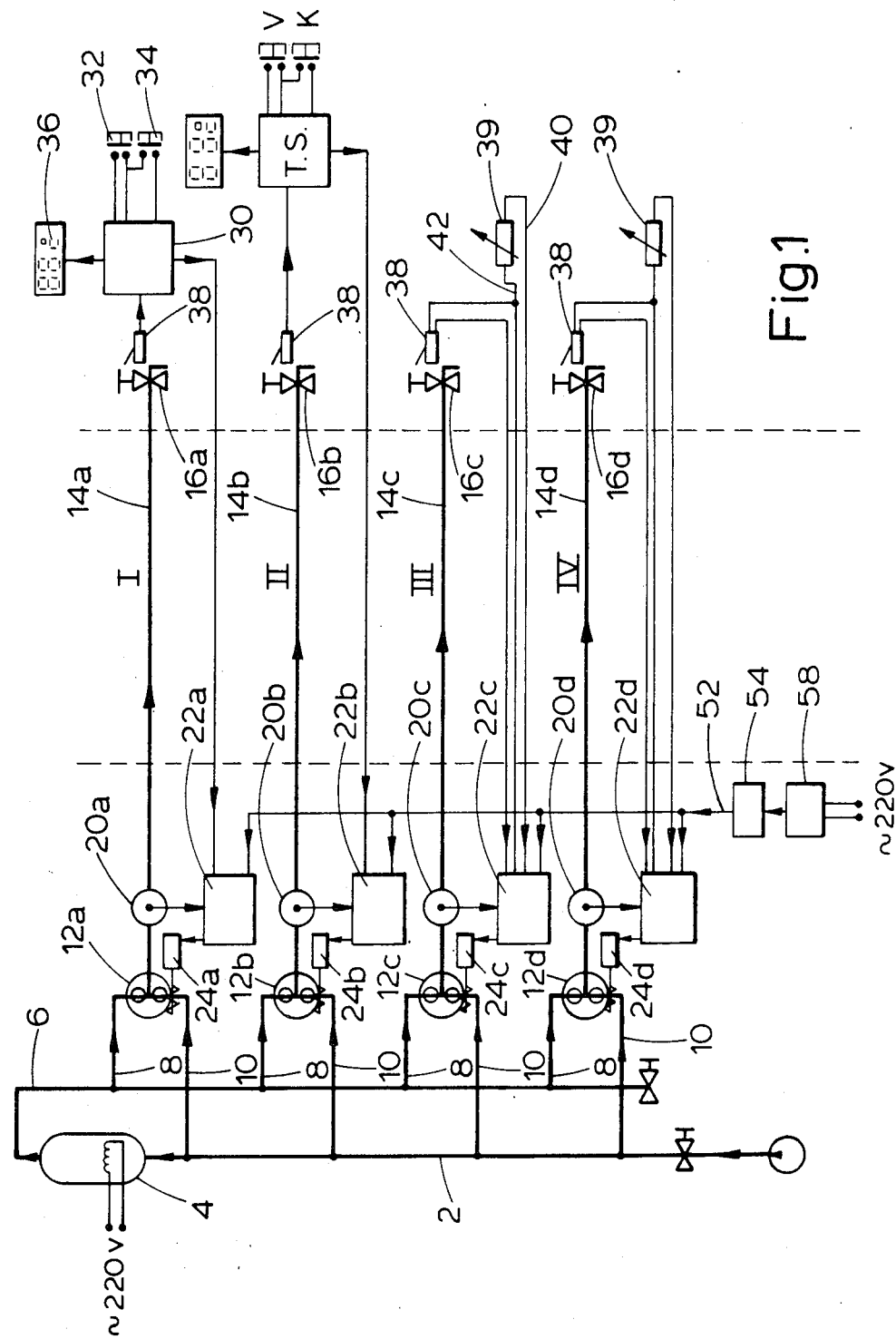
FIG. 1 is a diagram illustrating an embodiment of the system.

FIG. 1 is a diagram illustrating the operation of a sanitary system in accordance with the invention, for supply of hot and cold water to a desired number of outlet locations. In FIG. 1 the reference number 2 designates a pipe for supply of cold water to a hot water storage heater 4, wherefrom a pipe 6 delivers hot water via branch tubes 8 to altogether four thermostatically controlled mixing valves 12a, 12b, 12c and 12d which are supplied with cold water from the pipe 2 via branch tubes 10. In the diagram are shown four mixing valves for delivery of water to four outlets, while it will be understood that the system may be utilized for any desired number of outlet or tapping locations. The mixing valves preferably are designed in the shape of separate valve units in one single central valve block, mounted adjacent or very close to the hot water heater and shall otherwise be described in more detail below. From respective of the mixing valves 12a–12d extend respective separate pipes 14a–14d to respective tapping locations 16a–16d, at which locations the water quantities are controlled. In a system in accordance with the invention the mixing of cold and hot water takes place in the mixing valves 12a–12d, while delivered water quantity is controlled by the discharge valves or faucets 16a–16d.

Each of the mixing valves includes further a temperature sensing element 20a–20d and a computerized temperature control unit 22a–22d including a motor 24a–24d for carrying out the mechanical adjustment of each separate mixing valve. The system includes further a computerized temperature control at each of the discharge valves, herein designated with the number 30. The temperature control can be carried out in accordance with any suitable method. In the illustrated solution the two uppermost outlet locations have been designated with I and II, a so called manually operated display solution having a pushbutton 32 for warmer, and a pushbutton 34 for colder water, respectively, and a display 36 showing the desired water temperature. The system includes further preferably a micro switch 38 mounted in each faucet and which is turned on when the faucet is closed and transmits a signal to the computer, such that the same is operable to effect that the mixing valve is moved by means of the motor to one of its extreme positions, for instance to the cold water position, whereby flow of water through the mixing valve is hindered when the discharge faucet is closed. In conventional thermostatically controlled mixing valves nonreturn valves must be located preferably in the supply pipes for both cold and for hot water in order to prevent water flow through the mixing valves when the valves are in closed position. Such water flow through the valve itself will normally take place because the water pressure on the hot water side and cold water side, respectively, seldom is exactly the same. Most often the cold water side will maintain a higher pressure. A special feature of the system in accordance with the invention is that nonreturn valves can be omitted since the mixing valve will function as to reduce water flow.

The two lowermost tapping locations designated with III and IV, differ only from the tapping locations I and II in that the water temperature, instead of being controlled by means of pushbuttons and a display, is controlled by a pivot handle having an internal potentiometer 39, and a temperature scale, such that one may in known fashion adjust the desired temperature of the water to be discharged. The potentiometer is connected via wires 40, 42 to the computerized temperature control unit 22c or 22d which again controls the mixing valve 12c and 12d via the temperature sensing device 20c or 20d and the control or steering motor 24c or 24d. The various control units in the system including the computers, the motors, etc. receive electrical power via wires 52 from a storage battery 54 which is charged automatically via a charging unit 58 from the public power supply.

Figure 2:
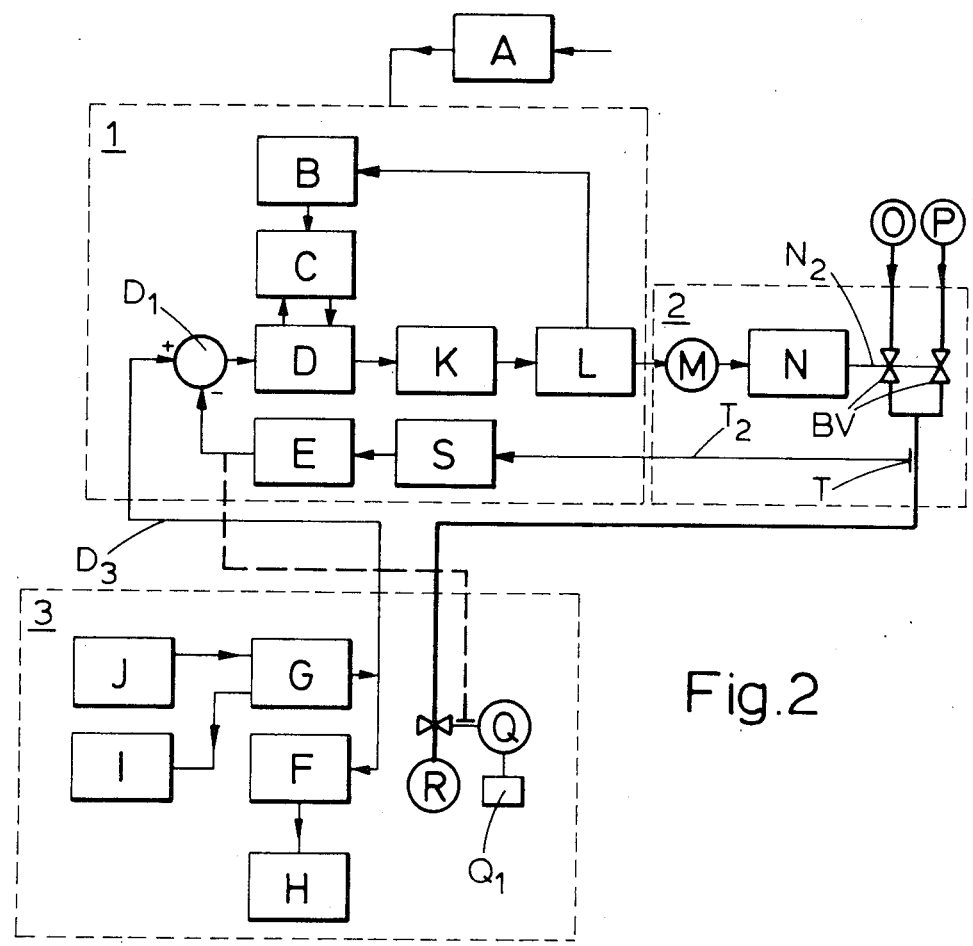
FIG. 2 is a diagram of a computerized control of the system.

The computer or processor control and the various elements therein constitute presently known techniques and should not need any detailed description, since they are intended to be conventional products. The application thereof in the system is, however, somewhat special with regard to the control functions which are desired and the system is therefore illustrated in detail in the diagram shown in FIG. 2. The processor control is divided into three sections, each of which is framed by dashed lines and designed with the numbers 1, 2 and 3. Section 1 constitutes the temperature control itself, section 2 comprises the water mixing section including the temperature sensing of delivered water, while section 3 consists of the manual temperature control and the water discharge. The processor control itself is positioned in section 1 and may be carried out with special processor cards or cartridges which are connected to each separate valve unit or in the form of one single central processor unit. In section 1, the letter A designates the power supply which consists of a transformer, a charging unit, and a storage battery for delivery of electric power, for instance with a voltage of 12 volts. The power supply will function independently of the city power supply for at least ten days. The letter B designates a converter from analogue to digital values, C designates a directional selector for the motor, D designates a temperature regulator including a temperature control element D1 which is controlled from section 3 via a wire D3. Section 3 in the system is mounted at the discharge or tapping location and includes a manually operated control unit including pushbuttons J and I for increase and reduction of the water temperature, respectively. G is a pre-set element for defining the temperature. H is a display which shows the desired temperature and F is a converter for operation of the display. In section 2 the letter T designates a temperature sensing element which via a wire T2 is connected to a converter S in section I for converting temperature to voltage, and further E is a converter for converting from analogue to digital values. K designates an amplifier for the motor, L is a converter which converts motor amps to voltage for delivery of power to the motors designated with the letter M in section 2. N is a gear drive and N2 designates a motor shaft which moves the valve elements until the temperature in the temperature control element T corresponds to the temperature defined by the control in section 3. The letters O and P designate supply pipes for hot and cold water, and the letter R likewise designates the valve for the taping of mixed water, while Q designates the manual maneuvering means, for instance a handle on the valve. In a preferred embodiment there is further mounted in the discharge valve a microswitch Q1 (designated 38 in FIG. 1) which serves for switching off the temperature control when the valve is being closed. This means effects, via the processor control, that when the mixing valve BV is moved to one of the extreme positions, preferably the cold water position, flow of water through the mixing valve is hindered. The cold water position is preferred because thereby one is safeguarded against initial tapping of pure hot water, which otherwise would include the risk of scalding.

Figure 3:
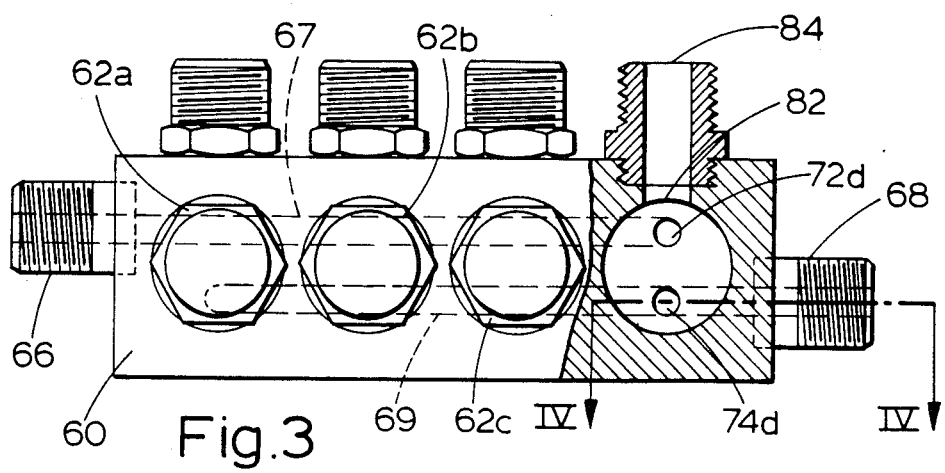
FIGS. 3 and 4 are a longitudinal view and a plan view respectively, partly in section, of a thermostatic mixing valve in accordance with the invention, embodied in a central block.
Figure 4:
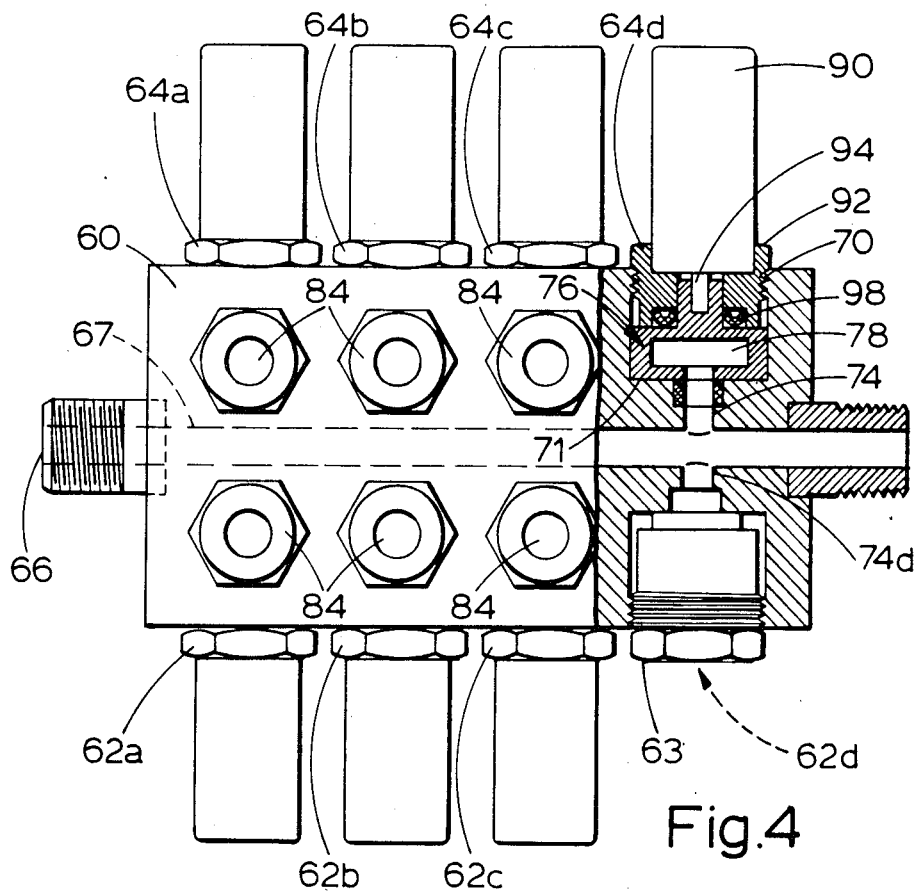
Figure 6:
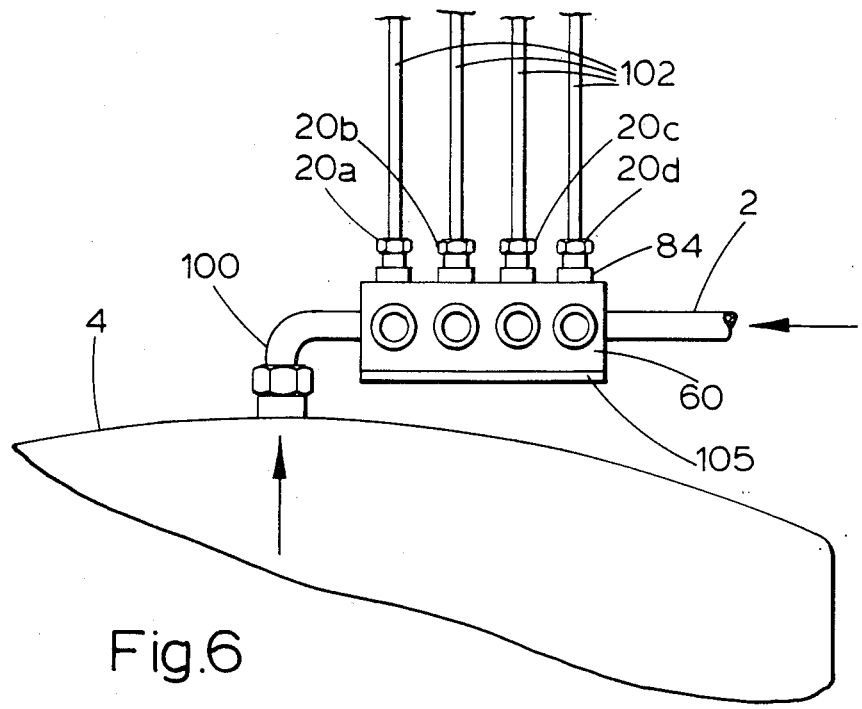
FIG. 6 is a view illustrating the mounting of the central block valve in accordance with the invention in conjunction with a hot water storage heater.

A sanitary system in accordance with the invention can be utilized for a desired number of discharge or tapping locations. In a family apartment or a private house one will usually have from four to eight tapping locations. In accordance with the invention all mixing valves for the separate tapping locations are provided in one single valve unit, preferably realized in the form of a "central block" which is mounted close to the hot water storage heater. An embodiment of such a valve unit is illustrated in FIGS. 3 and 4 which are a longitudinal view and a plan view, respectively, partly in section, of a thermostatically controlled mixing valve unit in accordance with the invention. FIG. 6 is an elevation illustrating the mounting of the central block valve unit in conjunction with a hot water storage heater.

Figure 5:
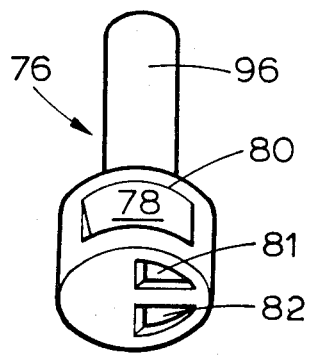
FIG. 5 is a perspective view of the valve design for the valve shown in FIGS. 3 and 4.

In FIGS. 3 and 4 the reference number 60 designates a valve block which is provided with altogether eight identical valve units, wherein four valve units 62a–62d are located in bores on one side of the block, while four other valve units 64a–64d are located in coaxially arranged bores on the opposite side of the block 60. The casing or block 60 itself may consist of metal or possibly plastics. The block 60 is provided with an inlet 66 merging into a longitudinal bore or passage 67 for supply of hot water to the respective valve units via branch passages 72, 74 to the various valve bores (all not shown), and in similar fashion a cold water supply via an inlet 68 communicates with a through-going passage 69 having branch passages to each respective valve. All valves are identical and only valve unit 64d is shown in detail on the right side of FIG. 4 taken along sectional plane IV—IV of FIG. 3, and shall be described in detail. In a bottom surface 71 of a bore 70 branch passages 72 and 74 merge from the cold and hot water passages 67 and 69, respectively. In the bore 70 is positioned a cylindrical, pivotable valve element 76 which is shown in perspective in FIG. 5. The valve element has a cavity 78 which in the bottom is provided with two axially extending ports 81 and 82 which are complementary with the water inlets 72, 74 in the valve block and which are disposed such that about 50% of the area of each inlet is open when the respective bores or ports are in a center position of the valve element. From cavity 78 extends a circumferentially positioned radial outlet 80 merging into an outlet opening through the cylinder surface in the valve block defining the bore 70 for mixed water flowing to an outlet 84 shown in FIG. 3 and therefrom to a discharge or tapping position via one of the pipes 102 as shown in FIG. 6.

Pivotal control of the valve element 76 is obtained by means of an electric motor 90 which is mounted coaxially of the inlet of the bore 70 via a transition nut 92. A drive shaft 94 of the motor 90 is engaged with a valve stem 96 of the valve element 76. The casing of the motor 90 includes a not shown speed reduction gear exchange in order to deliver adequate torque to the valve element. The number 98 designates a packing between the nut 92 and the valve element 76. The motor 90 is connected to the control system which is illustrated in section 2 on the diagram shown in FIG. 2.

The shown central casing or block 60 is as mentioned provided with cylinders or bores for altogether eight mixing valves. If for instance need only exists for seven mixing valves, the surplus bore is blocked off with a plug 63 which is shown in FIG. 4, such that the supply ports 72d and 74d are closed off.

In FIG. 6 is illustrated the mounting of the central block 60 in relation to hot water storage heater 4. Herein the number 100 designates the outlet for hot water from the hot water storage heater 4 and the cold water supply is designated with the number 2. The supply pipes for mixed water are designated with number 102 (corresponding to the pipes 14a-14c as shown in FIG. 1), which pipes lead to the various tapping locations. In the piping adjacent the outlets from the central block is further located temperature sensing elements 20a-20d as shown in FIG. 1. Not shown electric wiring from the same extends to a processor control 105 which is shown mounted on the underside of the central block. In FIG. 6 are shown only four outlets to the tapping locations. Altogether, however, eight outlet pipes 102 extend from the fittings 84 as shown in FIG. 4. On the discharge or tapping locations are, as previously stated, mounted only per se conventional single flow tapping valves or faucets. If the water supply system in question for instance comprises only four tapping locations, the surplus valve bores in the central block may instead of having valve elements, etc., be blocked off with nuts or plugs 63.

The single pipes 102 to each tapping location in the system of the invention may have a smaller calibration or dimension than usual in connection with tempered water supply systems because pairs of main pipes and branch pipes are not needed. One may thus utilize piping having for instance 15 mm OD, which gives about 0.5 cm² flow area. Such pipe dimension is otherwise used as standard on outlet piping in sanitary systems, and utilization of such piping in the system in accordance with the invention will thus not reduce the smallest available flow area.

Figures 7A, 7B:
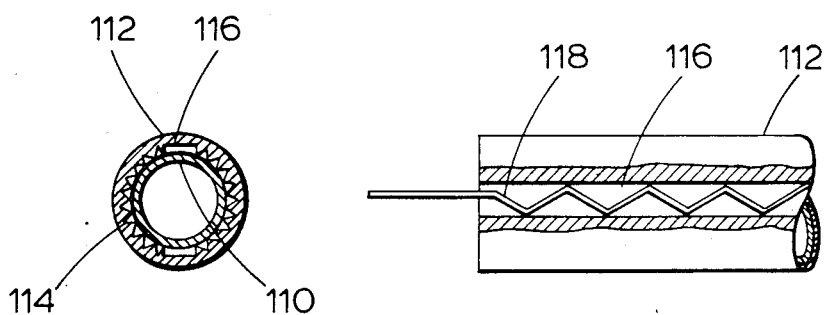
FIGS. 7a and 7b are sections showing a special tube construction, particularly suitable for use in the system in accordance with the invention.

A special requirement for the sanitary system in accordance with the invention is that to each tapping location extends one preferably thermally insulated pipe, and further at least one electrical conductor for the temperature control means on such tapping location. The electrical conductor or wire extends suitably along with the water pipe as one single unit, but the wire should be somewhat longer than the piping since the wire must be coupled to the control means at both ends of the pipe length in question. This problem is in accordance with the invention generally solved by utilizing plastic insulated metal piping, i.e. a piping provided with a layer or continuous bushing of plastics preferably provided with pores or being cellular in order to increase the thermal insulating ability thereof. In accordance with the invention the plastic layer or hose on the piping is provided with a continually extending open passage wherein, during the production of the same, i.e. during the application of the plastic coating or layer on the pipe, is positioned a freely or loosely positioned electrical wire which beforehand is provided with a zig-zag or meander shape. This has the effect that when the pipe is cut the end of the electrical wire can be pulled out and extended from its zig-zag position in the plastic insulation, such that the same can be connected to the adjacent contacts for the processor control. Such a conductor arrangement is illustrated in FIGS. 7a and 7b which show a cross-section and a longitudinal view, respectively, of such a piping product. The reference number 110 designates the water pipe itself, for instance a 15 mm copper pipe, while 112 designates the plastic coating which on the inside in addition to conventional longitudinal grooves or passages 114 is provided with a longitudinal passage 116, wherein during the production of the piping is positioned an electrical wire 118, which as shown in FIG. 7b is positioned with a zig-zag shape in the pipe. Instead of a zig-zag shape the wire may for instance be given a meander shape. The aim of such a configuration is simply to provide that the electrical wire is longer than the pipe in question. For the processor control it is sufficient to have on hand one wire along the pipe, since the pipe itself may serve as an electrical leader, but in most cases it is preferred to provide the pipe with a double or two electrical conductors.

The separate or single piping which is used with the sanitary system in accordance with the invention is preferably of the type which can be bent with a relatively small bending radius without creating the risk that the piping will be flattened. Copper piping with 16 mm diameter and provided with a plastic insulating layer is of this type. Such piping may, contrary to conventional piping which demands special mounting fittings, elbows, tees, etc., be extended and mounted as usual electric wiring, whereby it is possible to avoid cumbersome and ugly looking piping along walls, ceilings, etc. Extension of the piping through walls, etc., will furthermore be much simpler, and the frequently occurring problems in connection with expansions due to temperature variations are eliminated, since such piping is itself quite pliable such that bends and turns along the course of the piping will provide ample possibilities for pipe expansions.

The temperature control means at the tapping location may be designed as special fittings on the faucet as such, or in the form of a device which for instance is mounted on the wall behind the faucet.

It will be understood that the sanitary system in accordance with the invention can be realized in various embodiments. Thus, the central block including the mixing valves can be made in several ways, and it is not absolutely necessary to position the central block on or adjacent the hot water storage heater, since it can alternatively be positioned at a distance from the heater, for instance in the vicinity of a number of separate tapping locations. Such an alternative solution may be of interest if the hot water heater is used to deliver hot water to separate dwelling quarters.

The sanitary system in accordance with the invention will be extremely easy to use. When a user operates the single flow valve at the tapping location, the same will deliver water at the temperature which is ordered and which is indicated at the temperature display. If water with a different temperature is desired, for instance cold water, the water temperature is adjusted accordingly by means of the manually operated knobs on the display 36, or alternatively by means of a pivotal handle of the system is based on a potentiometer 39, as indicated in the diagram of FIG. 1. Upon adjustment of the given temperature, the processor will immediately provide that the motor, in dependence on the newly defined temperature, moves the valve element 76 exactly to that position wherein the desired temperature corresponds to the temperature which is being sensed by the temperature sensing elements 20a–20d. When the faucet is being closed, the microswitch 38 (cf. the function diagram shown in FIG. 1) transmits a signal to the processor, causing the motor to be actuated to pivot the valve element to one of its extreme or end positions. A special feature of the system in accordance with the invention is that control of the water mixture and the water quantity are divided and carried out in two separate valve units. The construction and operation of the mixing valves result in that need for check valves in the system is eliminated. Practical trials have shown that the time which lapses from the moment of opening the faucet to delivery of water with the pre-set temperature is only about 5 seconds.

The shown mixing valve construction includes a pivotable valve element having bottom and lateral valve ports. It will be understood that other valve types can be utilized in the system, for instance a modified embodiment of a valve as shown in applicant's Norwegian patent application No. 83.3107. In order to function in the system the valves must effectuate an alteration of the mixing proportions for cold and hot water, respectively, with maintenance of a constant flow area, and furthermore can close off at least one of the supply ports, either for cold or for hot water.

I claim:

1. A sanitary water distribution system for supplying hot or cold water or mixtures thereof of any desired proportion from a central location to a plurality of tapping locations, said system comprising:
   a plurality, equal to the plurality of tapping locations, of thermostatically controlled water mixing valves located at the central location and remotely from respective of the tapping locations;
   a hot water storage heater connected to supply hot water to each of said mixing valves;
   means for supplying cold water to said hot water storage heater and to each of said mixing valves;
   each said mixing valve including valve means for varying the proportion of hot and cold water mixed and discharged thereby;
   each said mixing valve having extending therefrom to a respective tapping location a respective single pipeline for the supply of water from said mixing valve;
   each said pipeline having connected thereto, at the respective tapping location, a respective manual tapping valve for controlling the quantity of water discharged therefrom;
   manually operated means at each tapping location for selecting a desired temperature of water to be discharged by the respective said mixing valve through the respective said pipeline and tapping valve;
   display means at each tapping location and responsive to the respective said manually operated means for displaying the respective selected desired temperature; and
   processor control means, responsive to a respective said manually operated means and operatively connected to said valve means of a respective said mixing valve, for adjusting the proportion of hot and cold water mixed and discharged by said mixing valve in response to and as a function of the desired temperature selected by said manually operated means.

2. A system as claimed in claim 1, wherein each said mixing valve includes at the outlet thereof a temperature sensing element connected to the respective said processor control means.

3. A system as claimed in claim 2, wherein each said processor control means includes a temperature control section, a supply section, and a pilot and maneuvering section at the respective tapping location.

4. A system as claimed in claim 1, wherein each said tapping valve includes switch means for, upon said tapping valve being closed, moving said valve means of the respective said mixing valve to a position hindering the discharge of water from said mixing valve.

5. A system as claimed in claim 4, wherein said switch means moves the respective said valve means to an extreme end position thereof, thereby stopping the passage through said mixing valve of one of cold water or hot water.

6. A system as claimed in claim 5, wherein all of said mixing valves are located in a single valve casing having common inlet passages for the introduction of cold and hot water and separate outlets through respective said mixing valves for the discharge of water mixtures.

7. A system as claimed in claim 6, wherein each said valve means is mounted for rotation within a respective cylinder in said casing by means of a respective motor operable by the respective said processor control means.

8. A system as claimed in claim 7, wherein each said valve means has therein inlet ports for connection to said cold and hot water inlet passages of said casing, the extent of such connection being variable by rotation of said valve means by said respective motor, thereby varying the mixing proportion.

9. A system as claimed in claim 1, wherein each said pipeline comprises a pipe for the passage therethrough of water, an outer layer of insulation covering said pipe, said insulation having at an inner portion thereof a passage extending continuously throughout the length thereof, and an electrical conductor within said passage for connecting the respective said manually operated means to the respective said processor control means, said electrical conductor having a length greater than said pipeline and being accommodated within said passage by a zig-zag or meander configuration.

* * * * *